Feb. 6, 1951 P. R. PRETZER 2,540,489
PACKING MACHINE WITH MEANS FOR FEEDING A BAG OVER DISCHARGE END OF
CHUTE CARRYING VEGETABLES AND COMMON MEANS FOR DISCHARGING
VEGETABLES INTO BAG AND FILLED BAG INTO ANOTHER CHUTE
Filed July 12, 1949 3 Sheets-Sheet 1
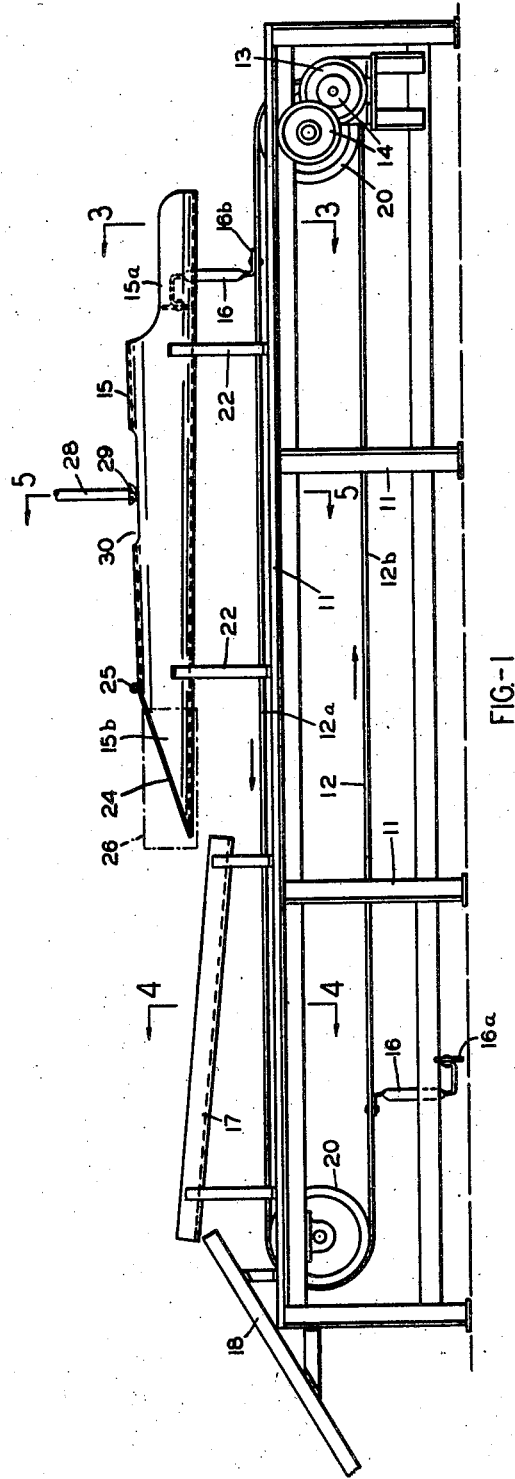
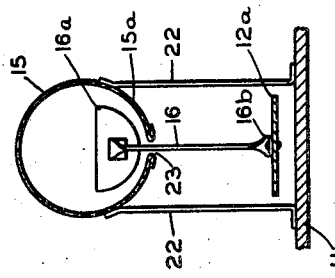
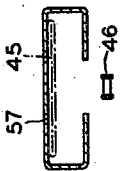
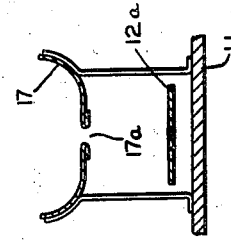
*INVENTOR.*
PAUL R. PRETZER
BY
Hyde, Meyer, Baldwin & Doran
ATTORNEYS Feb. 6, 1951   P. R. PRETZER   2,540,489
PACKING MACHINE WITH MEANS FOR FEEDING A BAG OVER DISCHARGE END OF
CHUTE CARRYING VEGETABLES AND COMMON MEANS FOR DISCHARGING
VEGETABLES INTO BAG AND FILLED BAG INTO ANOTHER CHUTE
Filed July 12, 1949   3 Sheets-Sheet 2
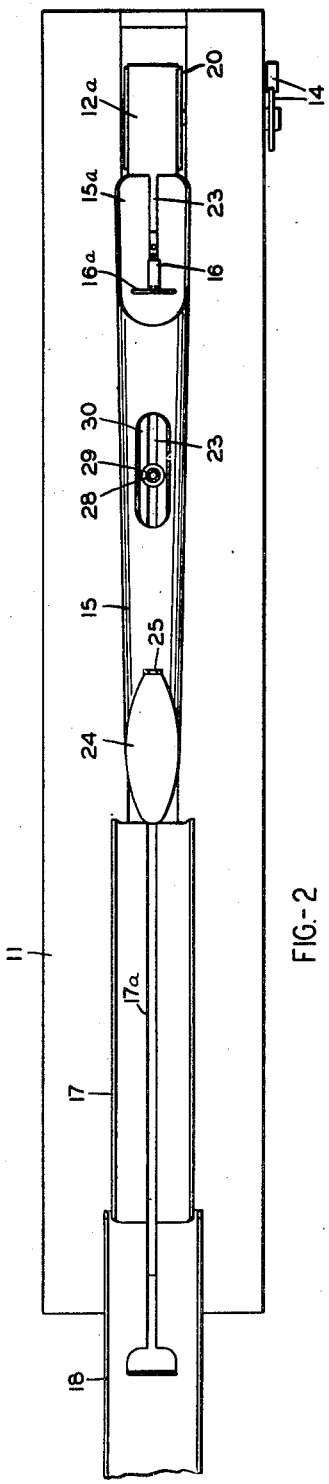
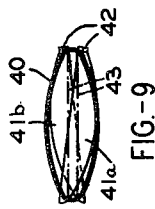
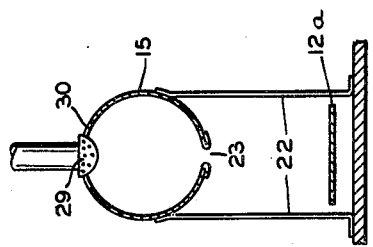
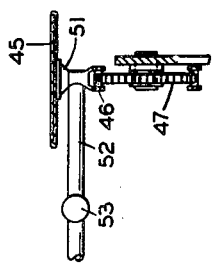
*INVENTOR.*
PAUL R. PRETZER
BY
*Hyde, Meyer, Baldwin & Doran*
ATTORNEYS Feb. 6, 1951 P. R. PRETZER 2,540,489
PACKING MACHINE WITH MEANS FOR FEEDING A BAG OVER DISCHARGE END OF
CHUTE CARRYING VEGETABLES AND COMMON MEANS FOR DISCHARGING
VEGETABLES INTO BAG AND FILLED BAG INTO ANOTHER CHUTE
Filed July 12, 1949 3 Sheets-Sheet 3

INVENTOR.
PAUL R. PRETZER
BY
Hyde, Meyer, Baldwin & Doran
ATTORNEYS

Patented Feb. 6, 1951

2,540,489

UNITED STATES PATENT OFFICE 2,540,489

PACKING MACHINE WITH MEANS FOR FEEDING A BAG OVER DISCHARGE END OF CHUTE CARRYING VEGETABLES AND COMMON MEANS FOR DISCHARGING VEGETABLES INTO BAG AND FILLED BAG INTO ANOTHER CHUTE

Paul R. Pretzer, Brooklyn Heights, Ohio, assignor to Walter F. Pretzer

Application July 12, 1949, Serial No. 104,320

6 Claims. (Cl. 226—18)

The invention relates to apparatus for packaging and is particularly adapted to packaging small units of vegetables, such as leaf lettuce, radishes, endives, green onions, broccoli, spinach, etc.

The invention arises from the desire of greenhouse vegetable gardeners or others growing vegetables in large quantity to get their goods to market at the lowest cost and as quickly as possible, as well as in neat, serviceable, attractive packages. The vegetables referred to, and others, are usually bundled and placed in thin transparent "cellophane" or other paper bags, either wholly by manual effort, which requires considerable dexterity and involves delay, or by mechanisms which are complicated and expensive and frequently get out of order in service.

One object of the invention, therefore, is to provide improved packaging mechanism which satisfactorily accomplishes all or most of the packaging task, but which is of very simple form, dispenses with a considerable proportion of manual labor, wraps the goods in an attractive package, and which is not likely to get out of order in service.

Another object is to provide improved packaging mechanism of the character described, including means for accepting in rotation groups of vegetable supplied to it and which advances them upon a path along which they are moistened and compacted, and finally are introduced into bags which have been opened and delivered to a receiving position, following which the packages are discharged in regular order for packing into baskets, cartons or the like.

A further object of the invention is to provide novel and improved continuously operating means for receiving the goods to be packaged, conveying them in spaced units toward a holder for a bag or similar closure, inserting them successively into the bags, and, in uninterrupted sequence when desired, discharging the packaged goods for insertion into a container for safe transportation.

A further object of the invention is to provide packaging apparatus of the type described, wherein means is provided for guiding the goods into the bag or closure.

A further object of the invention is to provide moisture supply means cooperating with the guiding means and arranged to provide a water spray which serves the double function of a lubricant to facilitate movement of the goods along the guide means, and also as a freshener for keeping the vegetables in good condition during transit to market.

A further object of the invention is to provide packaging apparatus of the character described which can be fabricated easily and cheaply from readily available materials such as steel sheets and straps and standard sizes in lumber.

Other objects and advantages will be apparent from a study of the present specification, in conjunction with the accompanying drawings, in which:

Fig. 1 is a side elevational view of my improved packaging device;

Fig. 2 is a top plan view of the device;

Figure 6:
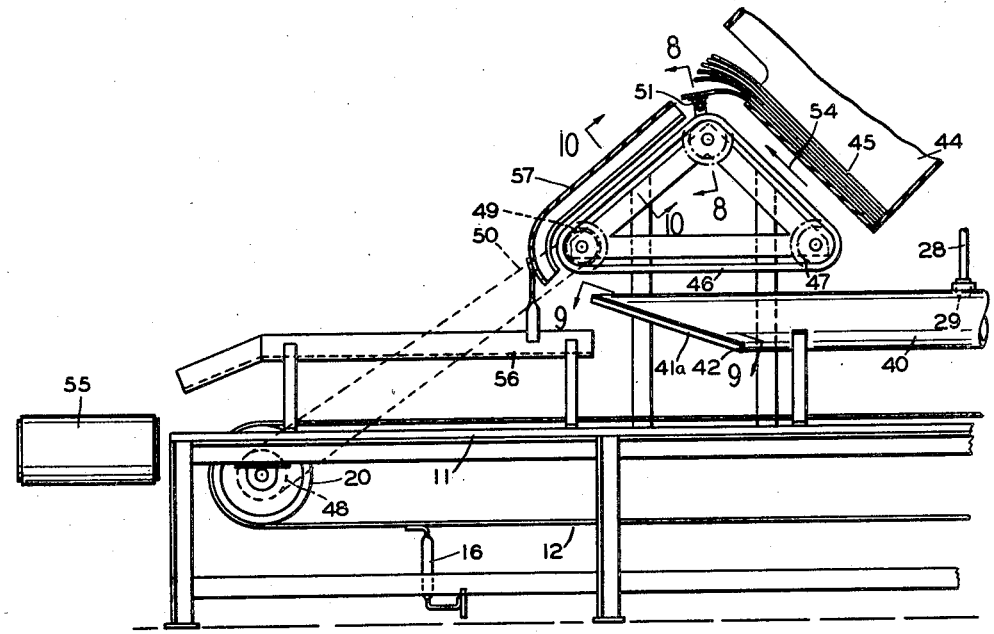
Figure 7:
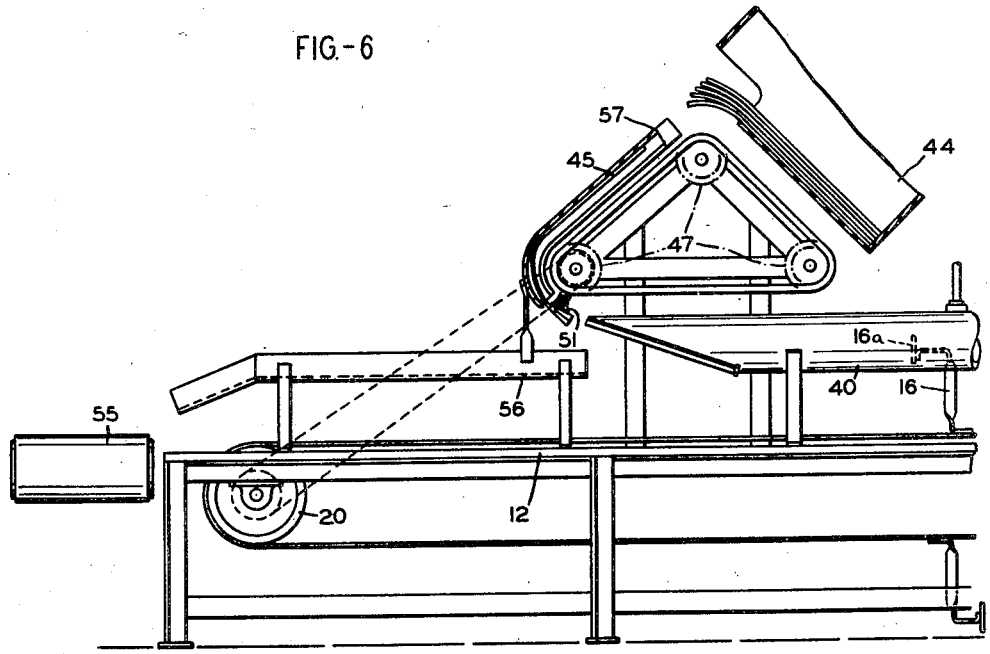

Figs. 3, 4 and 5 are sectional views taken respectively on the lines 3—3, 4—4 and 5—5 of Fig. 1;

Fig. 6 is a side elevation, on a larger scale, illustrating a modified form of the invention;

Fig. 7 is a similar view, showing another position of the parts;

Fig. 8 is a detail sectional elevation on the line 8—8, Fig. 6;

Fig. 9 is a sectional plan view on the line 9—9, Fig. 6, and

Fig. 10 is a detail section on the line 10—10, Fig. 6.

According to the present invention, I provide an elongated table or support upon which is mounted a horizontally disposed trough or guide casing open at both ends. To one end, which is in tray form, are fed the goods to be packaged, to be advanced by a pusher to the opposite end, where the bundle is introduced into the open end of a bag presented to it. The articles may be supplied tied up in bundle form, or the bundle may be gathered together in the tray. All bundles are moistened not only to reduced friction and promote slipping but also to keep the goods fresh. The bags may be opened and laid in place either manually or automatically, as will appear later. As each bag is filled, it is advanced further and discharged, ready for packing with others into the final carton or other group container.

The apparatus shown for the purpose in Figs. 1 and 2 comprises a table or bench 11, an endless belt 12 having a top race 12a above the level of the bench, and a bottom race 12b below it, motor means 13 having the usual power supply conductors, starting means, etc., speed reducing gearing 14, a work guiding trough or chute 15, a plurality of spaced impellers 16 carried by the belt and each provided with an enlarged paddle portion 16a. The final bagging portion of the trough is arranged to receive and support an empty container fed to it, beyond which delivery chute means 17, 18 controls further movement of the goods packaged in the container.

The bench or table 11 may be of any suitable size and design, having due regard for the work to be done. Belt 12 travels over a pair of pulleys 20 mounted on the bench and spaced near opposed ends thereof, the top of each pulley extending upwardly through a slot in the bench so that the upper stretch of the belt 11 travels with clearance above the bench. Variation in belt speed may be achieved in any desired conventional manner, and in one working embodiment is accomplished by varying an electrical characteristic of an element of the motor by means of a rheostat.

The guide trough or chute 15 is of generally tubular contour throughout most of its length, but has a portion cut away at the receiving end to provide a receiving apron 15a, of open tray form, on which the work, here for convenience assumed to be a mass or bundle of leaf lettuce, may be gathered or laid, root end forward. The apron and tube are slightly tapered to converge forwardly or toward the left (Figs. 1 and 2) in order to compress and somewhat compact the bundle as it proceeds. The chute 15 is supported by laterally spaced legs 22 between which the top flight of the belt runs. The bottom wall or floor of chute 15 is provided with a slot 23 extending completely through the wall along its full length. This slot is provided to permit passage of the impeller stem 16 by means of which paddle 16a is attached to the belt. This paddle 16a is small enough to pass, with clearance, through the chute. Assuming that a bundle of leaf lettuce or other goods has been laid upon the apron 15a, and that the belt is in motion counterclockwise, as indicated by the arrows (Fig. 1), the next on-coming paddle will push the bundle through the chute 15, compressing it slightly laterally because of convergence of the apron and chute walls.

The discharge end 15b of chute 15 is provided with a snout closed by a free swinging trap door 24, hinged at 25, but biased by gravity to closed position. The shape of the snout facilitates application of an empty bag 26 thereon to a point where it acquires a friction grip on the chute and trap door. The root end of the lettuce engages and swings the trap door upwardly and expands the bag, enters the bag, and strips the bag from the chute. The loaded bag then drops into a delivery chute or trough 17 which has a longitudinal slot 17a in its bottom to permit passage of the impeller stem 16. The bag continues its advance movement, still actuated by the impeller paddle, finally dropping into another chute 18 along which it slides by gravity to a station where it may be packed in crates or baskets, for transportation to market.

Only two impeller blades are here shown. Obviously one or more can be used depending on the over-all length of the apparatus, the linear speed of the belt, and the rate at which items to be packaged are fed to the apron 15a.

Automatic means (not shown) may be used to feed goods to the receiving end of the trough, and the bundles thereof may even drop by gravity from a funnel-like hopper disposed above the apron.

I have found that the packaging operation described is materially facilitated by spraying the goods with water during its travel through chute 15. This serves both as a lubricant and freshener. The vegetable moves smoothly through the chute even though the leafy end is compressed by convergence of the chute walls, and, in the absence of the water spray considerable frictional resistance would result, not only interfering with operation, but also entailing possible consequent damage at least to the appearance of the packaged article. I therefore provide a water supply pipe 28, having a spray head 29. The top of chute 15 is cut away to provide an aperture 30 in registry with the spray head, and when the machine is in operation a light spray of water is continuously discharged downwardly into the chute.

In the apparatus so far described, the bags are applied to the final bagging portion of the trough manually. This is not necessary. Figs. 6 and 7 show an arrangement in which they are fed automatically.

The guide trough, here marked 40, is much like that before described. However, the trap door opens downwardly instead of upwardly. This door here includes right and left members 41a, 41b, hinged at 42 along lines which diverge slightly, so that in closed position the edges of the two doors overlap slightly, whereas in open position the doors are separated by a slot (indicated in dotted lines at 43, Fig. 9), to permit passage of the pusher stem. The doors are biased toward closed position by a spring (not shown).

The spray pipe 28 communicating with spray nozzle 29 also is sealed in the metal sheet of the guide trough so that leaves or other parts of the goods cannot protrude through an opening, as in the form shown in Fig. 1.

Above the final or bagging portion of the trough I mount a magazine or holder 44 in which is placed a pile of bags marked 45. These bags come in the usual flat form, packed in bundles. A bundle thereof is laid in the holder in the manner shown, with the upper open ends at the top. The upper end portions of the first two or three bags hang down a little, as shown. Beneath the holder is mounted an endless belt or conveyor 46 traveling over pulleys 47, the shaft of one of which is provided with means for driving it in timed relation with belt 12, such as by the pulleys 48, 49 and belt 50. On conveyor 46 is mounted a suction cup 51 communicating by way of flexible hose or conduit 52 with a source of suction (not shown). Cup 51 is connected to conduit 52 by suitable swivel joint 53 shown conventionally.

The upper two stretches of conveyor 46 travel in the direction of arrow 54 along inclined lines and the lower stretch horizontally. One of pulleys 47 lies just above the tip of the bag receiving snout of guide trough 40. Below said tip is mounted a discharge trough 56 upon which is supported a channeled and bent guide and bag opening member 57, slotted to permit travel of the suction cup.

The mechanism described withdraws the first bag from the supply magazine and applies it to the bagging snout of the trough ready for the next bundle of goods advanced to the bagging station by a pusher 16.

The swivel connection in the hose connections to the suction cup enables the latter to travel in its endless path without twisting the hose.

As said cup moves upwardly it drags across the face of the first bag, grips it and withdraws it from the bottom of the pile. The bags are closed tightly and because their two sides lie flat together they are somewhat stiff. The bag opener 57 insures bag opening. It lies or is mounted in such position that as the cup drags the bag along, the trailing part of the bag engages the opener, as shown in Fig. 7, which somewhat bends the bag and separates its two superposed flat sides, opening its mouth. As cup travel continues the bag is sleeved over the trough snout, like a stocking, until its bottom engages the trough end. Thereupon the suction cup is pulled off and proceeds, since the suction is of low value.

Now the pusher advancing the coming bundle of vegetables forcibly opens the door members, which then serve as a bridge across the gap to trough 56, and pushes the goods into the bag and then advances the wrapped package to and across table or trough 56 and then upon a laterally movable traveling belt conveyor 55 which conducts them to a place of carton or basket packing, as before.

In this machine all operations are automatic, except feeding the goods to the receiving end of the trough, and that may be made automatic also, as before stated.

From the study of the apparatus shown and described, it will be obvious that in both forms it can be readily and cheaply fabricated from commonly available materials. The bench 11 may of course be easily made from standard lumber sizes. The receiving trough 15 and the delivery chutes or troughs 17, 18 and 56 can be fabricated from sheet metal, such as steel, tin plate or aluminum. The legs 22 and the impeller stem 16 are ordinary steel straps. The motor 13 can be chosen from a wide variety of motor types. Means for attaching various elements to their supports are simple and conventional.

Other advantages of the invention will be apparent to those skilled in the art.

What I claim is:

1. Packaging means for introducing loose goods into open end bags, comprising an elongated chute having opposed receiving and delivery portions, said receiving portion being of open tray form and adapted to receive a group of articles to be packaged, an endless belt movable parallel to and adjacent said chute, the wall of said chute being provided with a slot extending the full length of said chute, a pusher attached to and movable with said belt and having a stem extending through and movable along said slot by belt movement from the receiving to the delivery portion of said chute, the delivery portion of said chute being adapted to receive an empty bag telescoped thereon, whereby a group of articles gathered in said chute is advanced along the chute by said pusher and is inserted into said bag and said bag with the articles therein is then stripped from said chute by continued pusher movement, a delivery chute being disposed in tandem with said receiving chute, said delivery chute likewise being adjacent to said belt and being provided with a slotted wall to receive the stem of said impeller, whereby a bag stripped from said receiving chute is delivered to said delivery chute and continues to be advanced thereon by said pusher.

2. Means for packaging a moving series of articles, each in its own bag, comprising a bench, a pair of belt pulleys supported on said bench in spaced relation, an endless belt mounted on said pulleys, motor means operatively engaging one of said pulleys, a horizontal tubular receiving chute fixed on said bench adjacent to and parallel to said belt, a trough like delivery chute also fixed on said bench adjacent to said belt and in tandem relationship with said receiving chute, one end of said delivery chute lying close to an end of said receiving chute whereby an article traveling through said receiving chute is delivered to said delivery chute, the wall portion of each said chute adjacent said belt being provided with a longitudinal slot parallel to said belt, a pusher attached to and movable with said belt and having a portion extending through said slots so as to be advanceable along the same by belt movement, said receiving chute have a receiving portion remote from said delivery chute, and a delivery portion adjacent said delivery chute, said delivery portion being adapted to have an empty bag telescoped thereon, said receiving portion being provided with an apron for convenient reception of an article to be packaged, whereby an article placed on said apron is advanced by said pusher and is inserted into said bag and said bag with the article therein is thereafter stripped from said delivery portion, is delivered to said delivery chute and is thereafter advanced along said delivery chute by said pusher.

3. Packaging means as defined in claim 2, wherein the walls of said receiving chute have a convergent taper from said receiving portion to said delivery portion, whereby an article advanced through said receiving chute by the pusher is slightly compressed upon arrival at said delivery portion.

4. Packaging means as defined in claim 2, wherein the delivery portion of said receiving chute is provided with a forwardly inclined trap door hingedly connected to the wall of said receiving chute at its rear end and biased to closed position, and wherein the open end of said bag, when telescoped on said delivery portion is in frictional contact with the surface of said trap door and with a wall portion of said receiving chute.

5. Packaging means as defined in claim 2, wherein a wall portion of said receiving chute is provided with water spray means arranged to direct a spray of water upon goods traveling along said chute.

6. Packaging means for introducing loose goods into open end bags, comprising an elongated chute having opposed receiving and delivery portions, said receiving portion being of open tray form and adapted to receive a group of articles to be packaged, an endless belt movable parallel to and adjacent said chute, the wall of said chute being provided with a slot extending the full length of said chute, a pusher attached to and movable with said belt and having a stem extending through and movable along said slot by belt movement from the receiving to the delivery portion of said chute, the delivery portion of said chute being adapted to receive an empty bag telescoped thereon, and automatic means for applying a series of bags, one by one, to the delivery portion of said chute in timed relation with operation of said pusher, comprising a magazine for holding he bags, a suction device movable along a path from the magazine to the delivery portion of the chute, and means for applying suction to said device.

PAUL R. PRETZER.

REFERENCES CITED

The following references are of record in the file of this patent:

UNITED STATES PATENTS

| Number | Name | Date |
|---|---|---|
| 942,257 | Hansen et al. | Dec. 7, 1909 |
| 1,267,730 | Wolfe | May 28, 1918 |
| 1,275,819 | Wright | Aug. 13, 1918 |
| 2,249,792 | Skinner | July 22, 1941 |
| 2,413,556 | Fourness et al. | Dec. 31, 1946 |
| 2,476,475 | Baum | July 19, 1949 |